UNITED STATES PATENT OFFICE.

CHARLES A. BROWNE AND ISAAC S. BROWNE, OF NORTH ADAMS, MASS.

IMPROVEMENT IN EXPLOSIVE COMPOUNDS.

Specification forming part of Letters Patent No. 152,790, dated July 7, 1874; reissue No. 6,564, dated July 27, 1875; application filed September 12, 1874.

*To all whom it may concern:*

Be it known that we, CHAS. A. BROWNE and ISAAC S. BROWNE, of North Adams, in the county of Berkshire and State of Massachusetts, have invented a new and useful Improvement in Explosive Compounds; and we do hereby declare that the following is a full, clear, and exact description of the same.

Our invention relates to a new priming compound, which is exploded by a current of electricity or the electric spark, when properly secured in an interruption of the electric circuit, so that a safe, certain, and economical method of exploding charges by electricity is secured. The use of the priming admits, also, in most cases, of the substitution of less expensive insulated wires for the more expensive gutta-percha or rubber insulators, except in submarine or very wet workings, where the common cotton insulation would be hardly sufficient.

Our priming compound consists of the mixture of fulminate of mercury with pulverized antimony in various proportions, with an addition of antimonic sulphide or other ingredients, if desired, for producing a greater or less degree of electric conductivity of the priming.

Our priming compound has been found to give the most satisfactory results in not being too easily exploded by weaker currents of electricity, nor requiring a battery of too great power to effect its explosion. It is prepared in the following manner: A small quantity of fulminate, having been dried by a gentle heat, (not above 212° Fahrenheit,) is passed through a fine sieve. The other ingredients, having been thoroughly pulverized, are also sifted in like manner. The several ingredients are then weighed, and thoroughly mixed by passing them several times through a sieve coarser than the one first used. Great care should be used in selecting the ingredients in as nearly a chemically pure state as possible.

The success of the priming compound is based upon the peculiar property of the conducting particles, when pure or mixed with other ingredients, of being heated by the passage of electricity to a sufficient degree to explode the fulminate with which it is in contact. By the finely-divided pure metal a high degree of conductivity is imparted to the compound, and therefore the use of cheap insulators admissible.

Different degrees of sensitiveness may be produced by changing the proportions, thus in a measure adapting it to electricity of varying tension. By increasing the quantity of conducting material it becomes more conductive, and consequently more sensitive to electricity of low tension. By decreasing the quantity of conducting material the opposite results are obtained.

The same changes and modifications may be successfully produced by varying the proportions of ingredients, without the admixture of other ingredients.

We are aware that mercury and antimony have been used in conjunction with other ingredients to form an explosive compound; but never the fulminate of mercury with comminuted metal, to distribute the electricity by its conductivity to all the particles of the fulminate instantaneously, and thereby cause a simultaneous explosion.

What we claim is—

An electrically-explosive compound, consisting of fulminate of mercury pulverized and intermixed with particles of metal, as and for the purpose described.

CHAS. A. BROWNE.
ISAAC S. BROWNE.

Witnesses:
CHAS. J. PARKHURST,
S. THAYER.